United States Patent
Bushman et al.

[15] 3,643,716
[45] Feb. 22, 1972

[54] MEANS FOR SECTIONIZING CITRUS FRUIT

[72] Inventors: Ronald C. Bushman, Pomona; Donn J. Rickard, Glendora, both of Calif.; John D. Webb, Winter Haven, Fla.; L. Bruce Alexander, San Marino; Cleveland B. Church, Whittier, both of Calif.

[73] Assignee: Brown International Corporation, Covina, Calif.

[22] Filed: Nov. 4, 1969

[21] Appl. No.: 873,850

[52] U.S. Cl. .................................................. 146/3 N
[51] Int. Cl. ........................ B26d 1/28, B26d 1/44, B26d 3/00
[58] Field of Search ............................. 146/3 N, 236, 54, 52

[56] References Cited
UNITED STATES PATENTS

| 3,081,805 | 3/1963 | Shrewsbury | 146/3 N |
| 2,552,733 | 5/1951 | Polk, Sr. et al. | 146/3 N |

*Primary Examiner*—Willie G. Abercrombie
*Attorney*—Paul A. Weilein

[57] ABSTRACT

With a plurality of sectionizing tools partially inserted into a corresponding plurality of citrus fruit that are impaled on corresponding holders, each holder rotates until a radial membrane of the fruit thereon impinges on the corresponding sectionizing tool whereupon the sectionizing tool makes a sectionizing stroke. In the meantime, a new plurality of fruit is being loaded manually on corresponding loading spikes that are adapted to transfer the new plurality of fruit to the respective holders.

29 Claims, 39 Drawing Figures

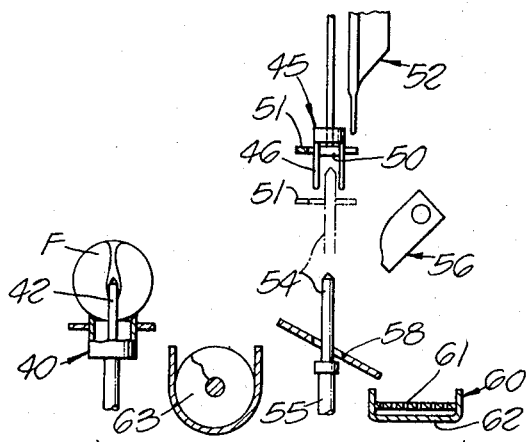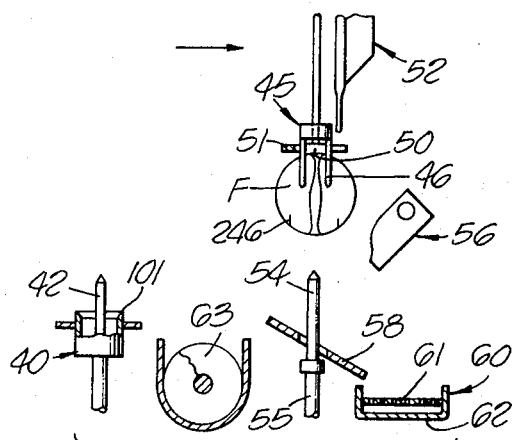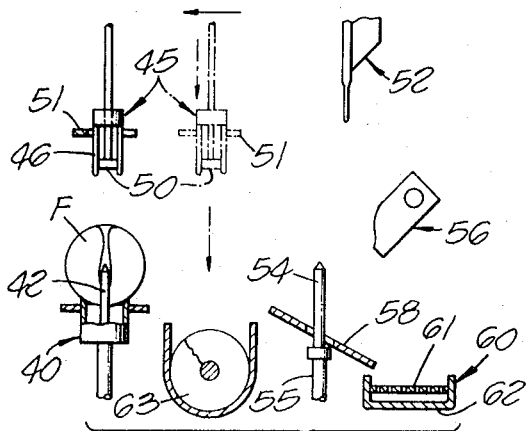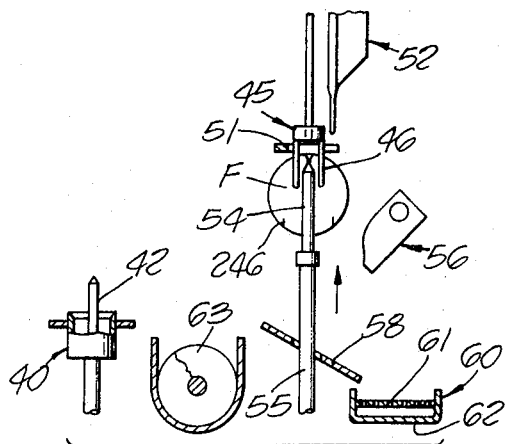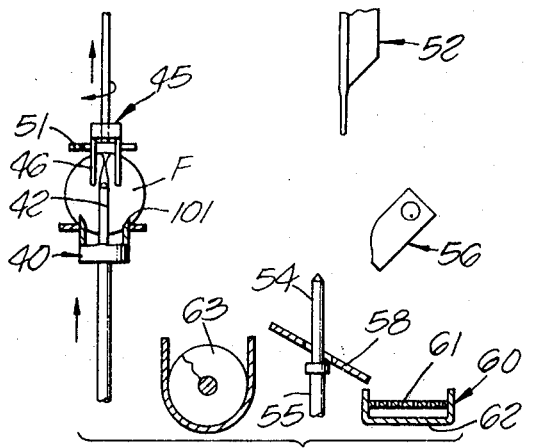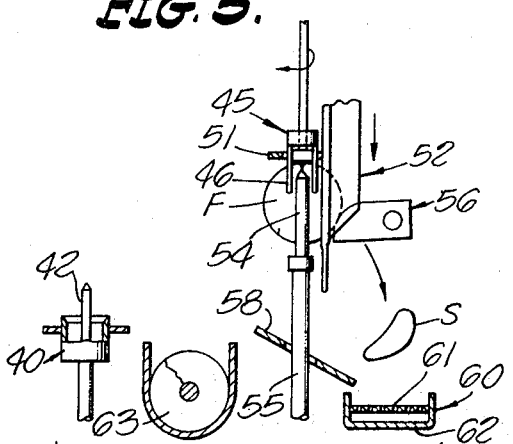

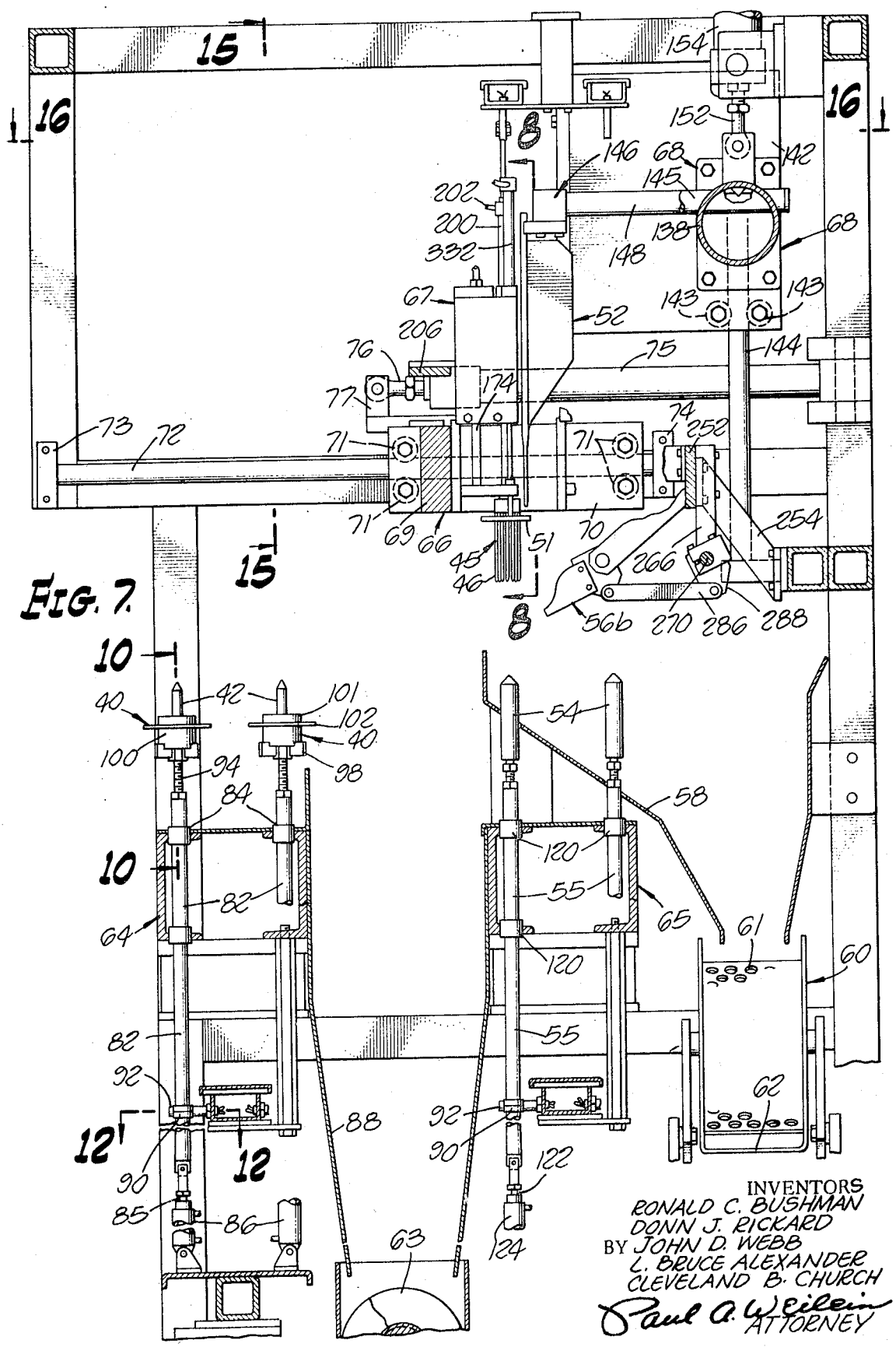

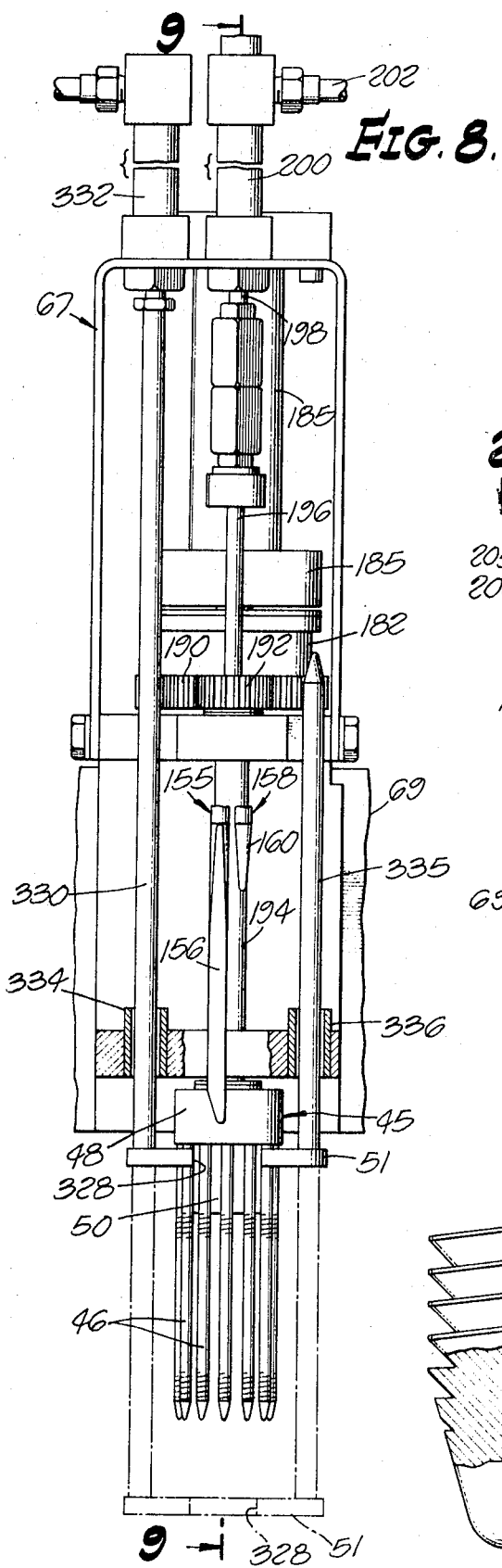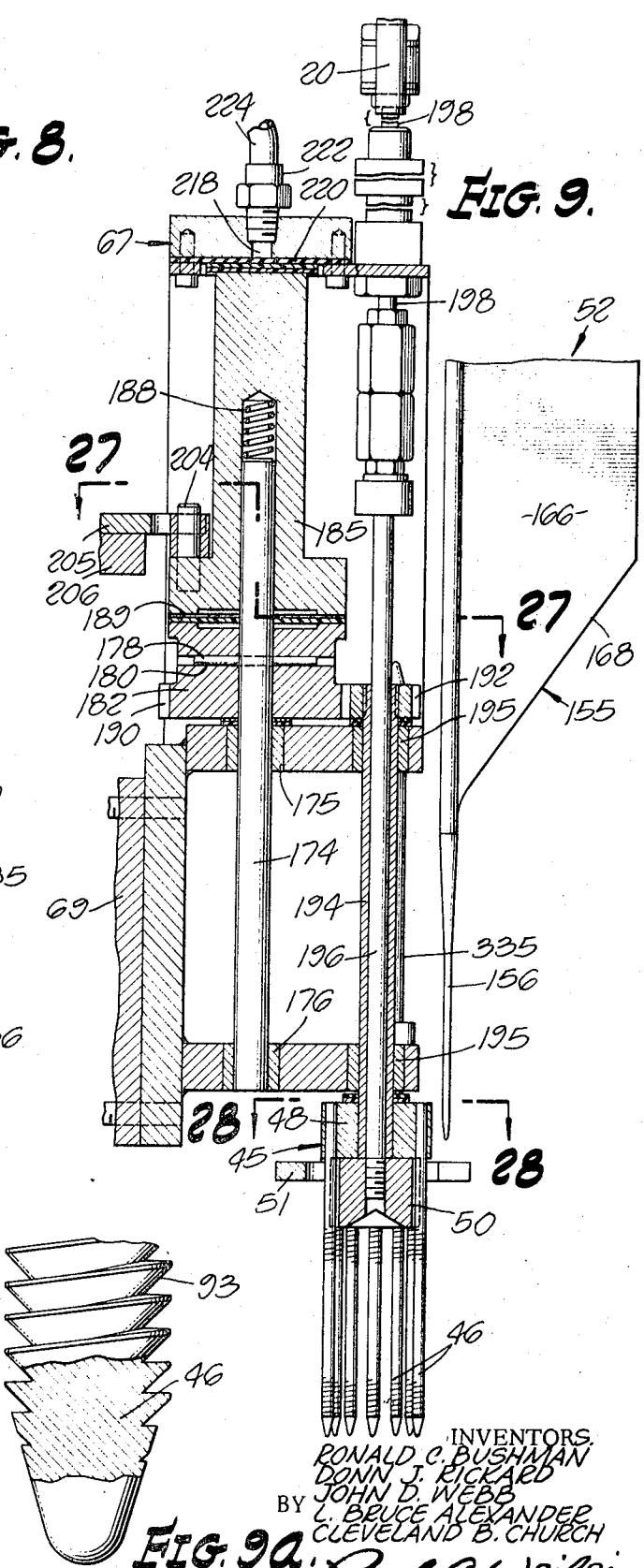

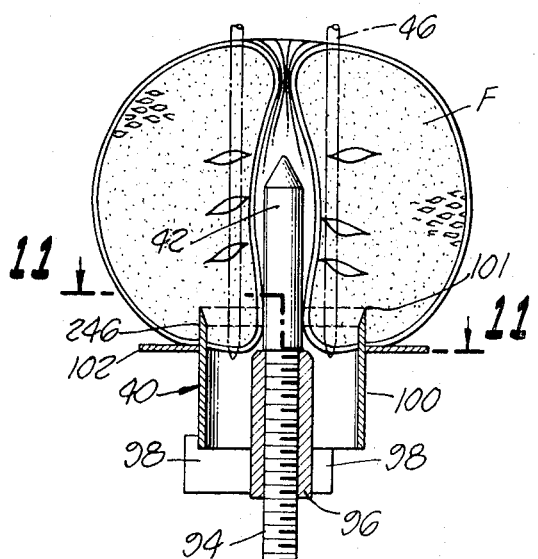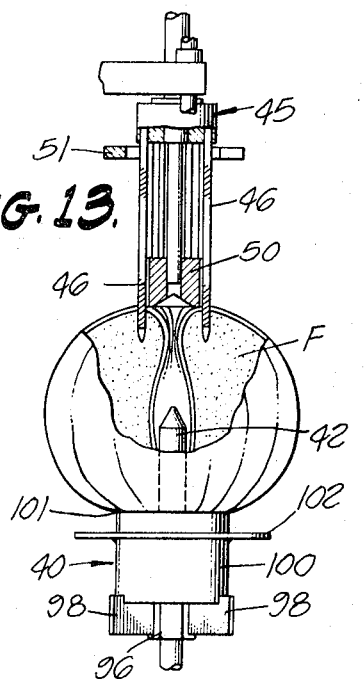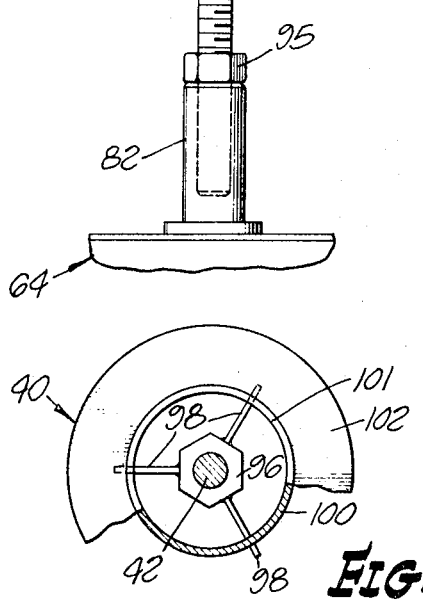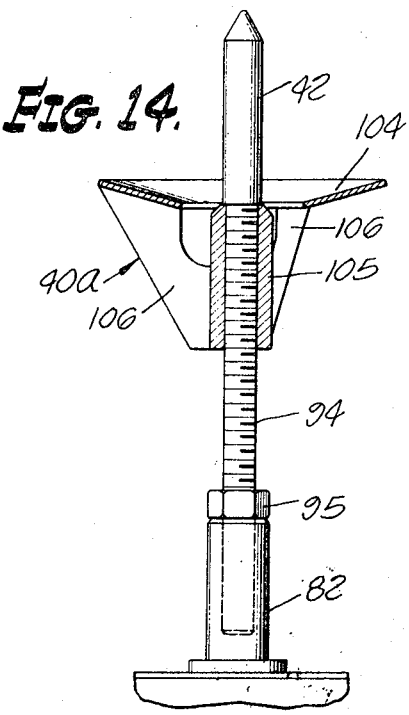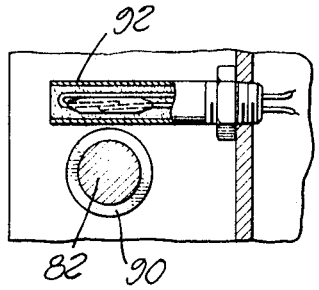

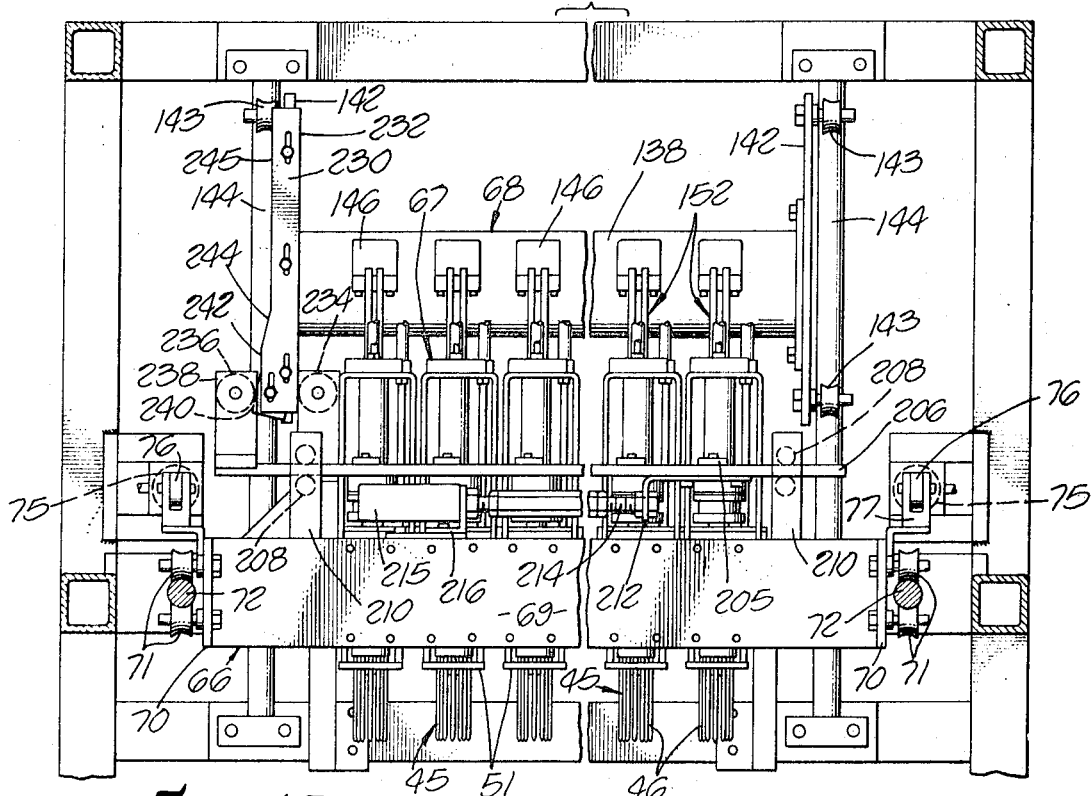
FIG. 15.
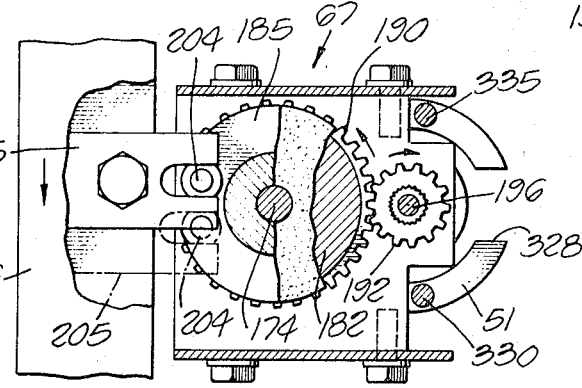
FIG. 27.
FIG. 28.
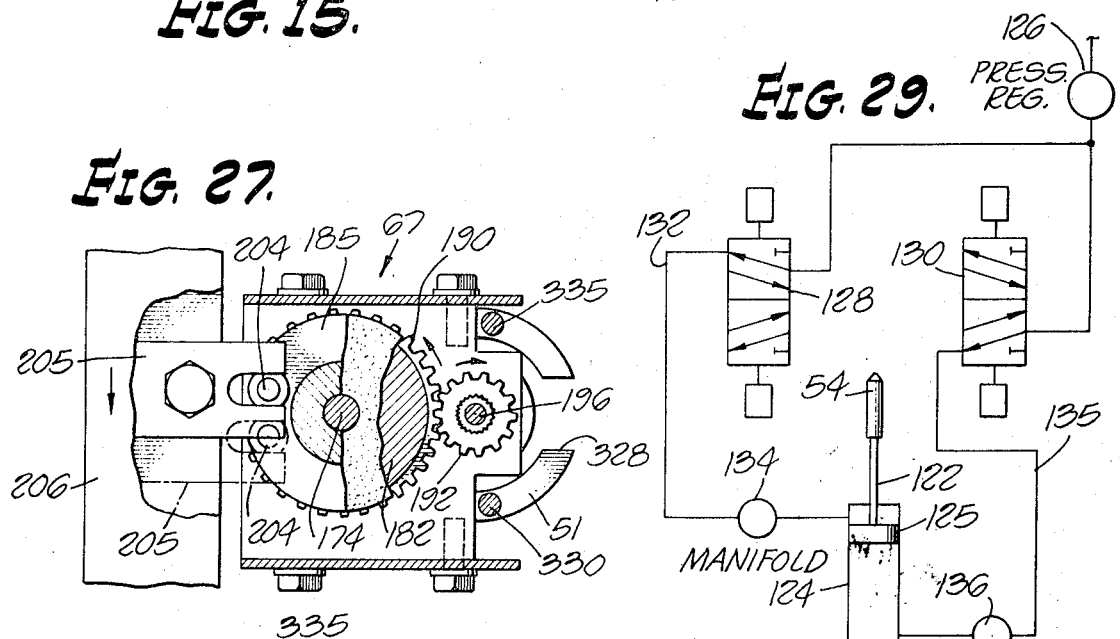
FIG. 29.

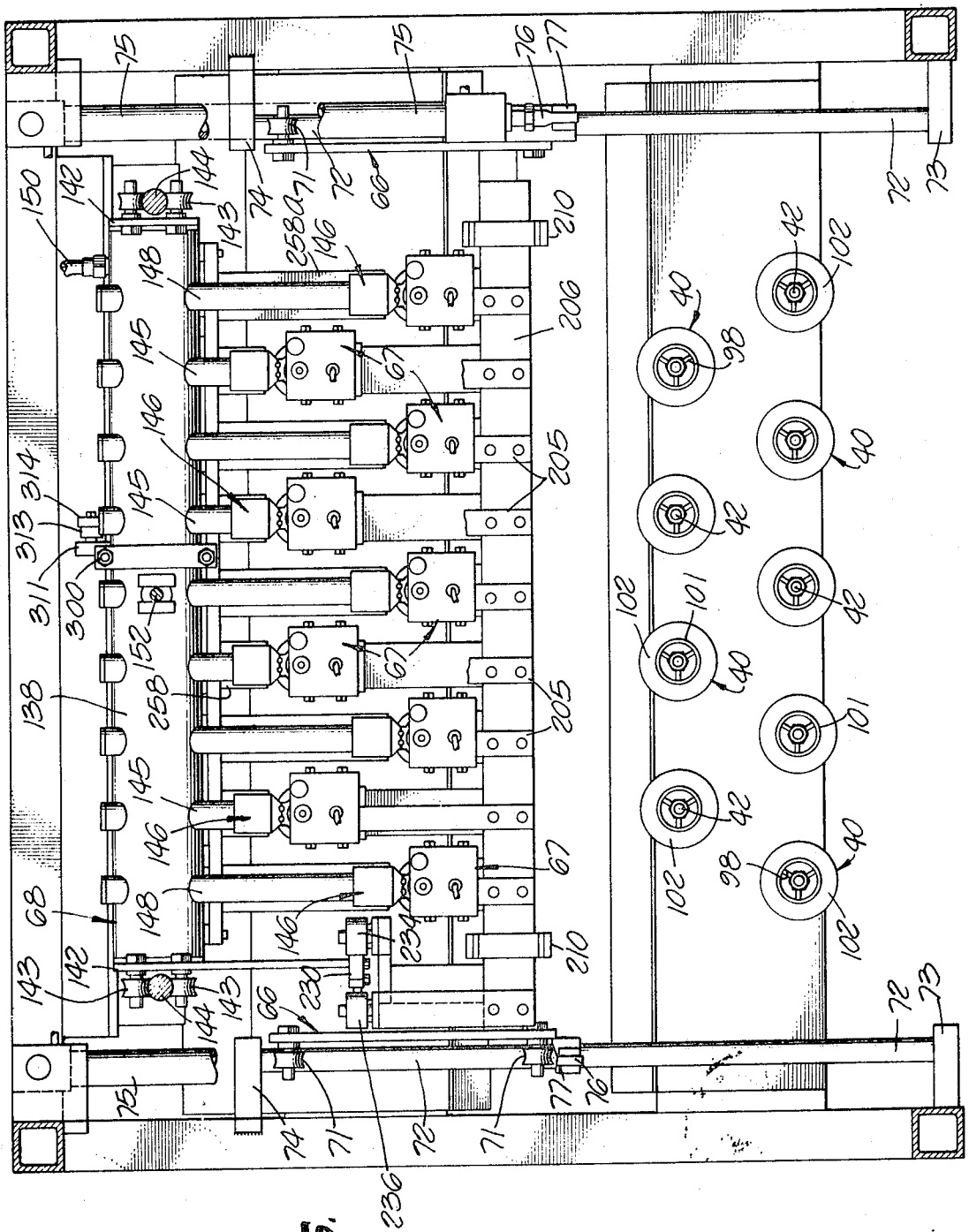

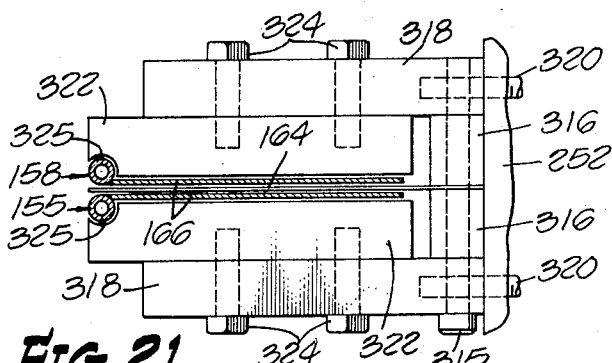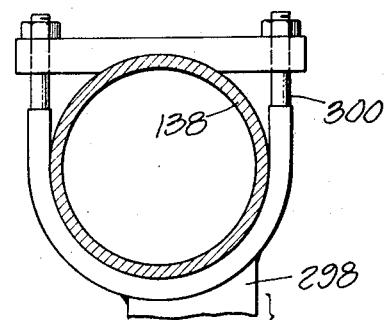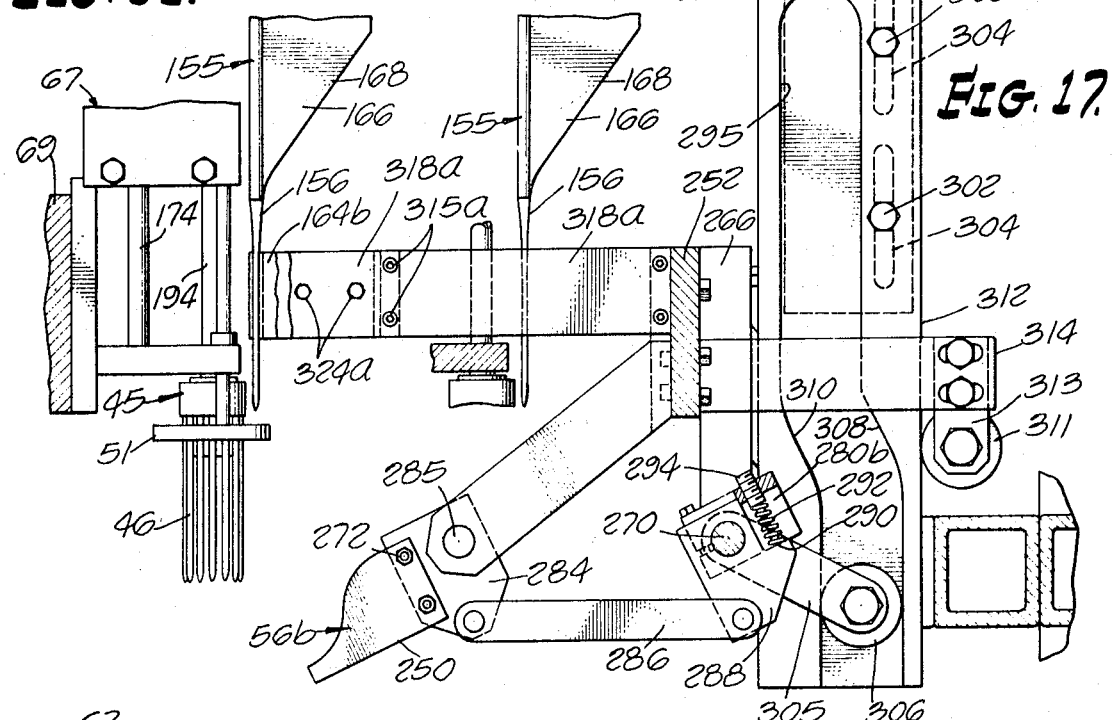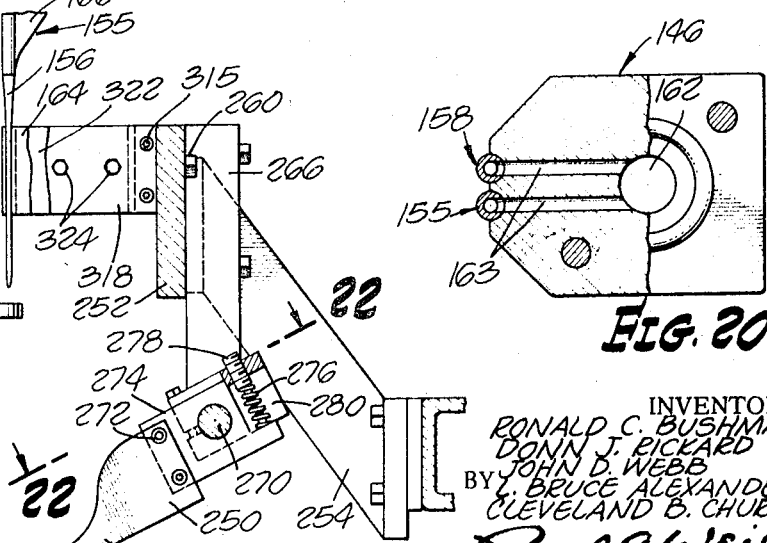

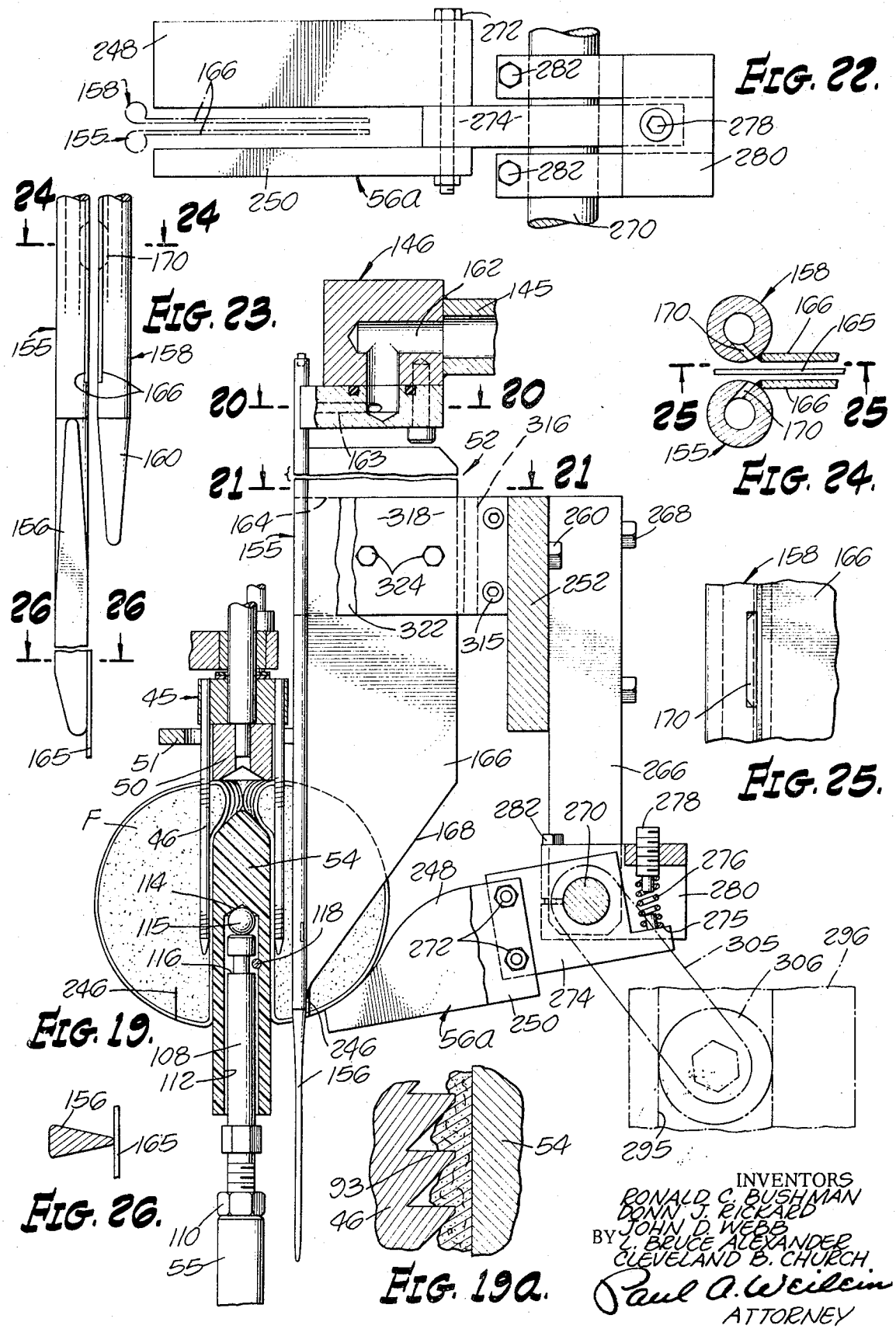

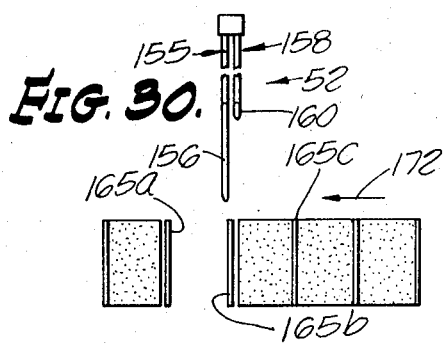
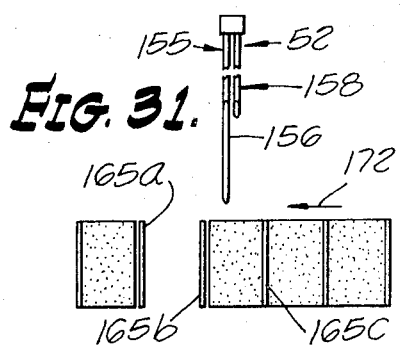
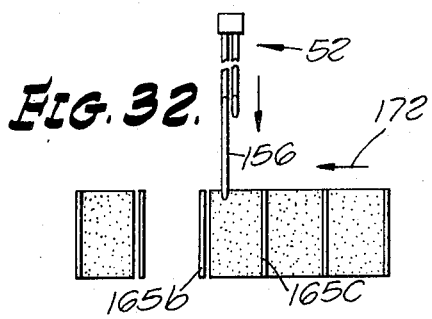
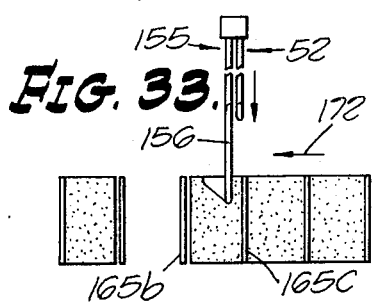
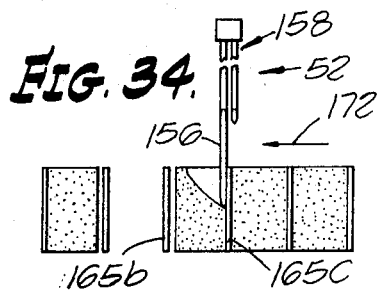
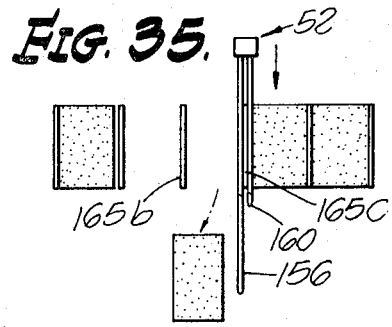
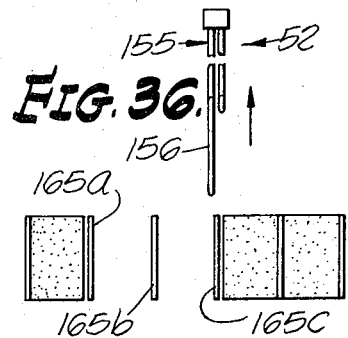
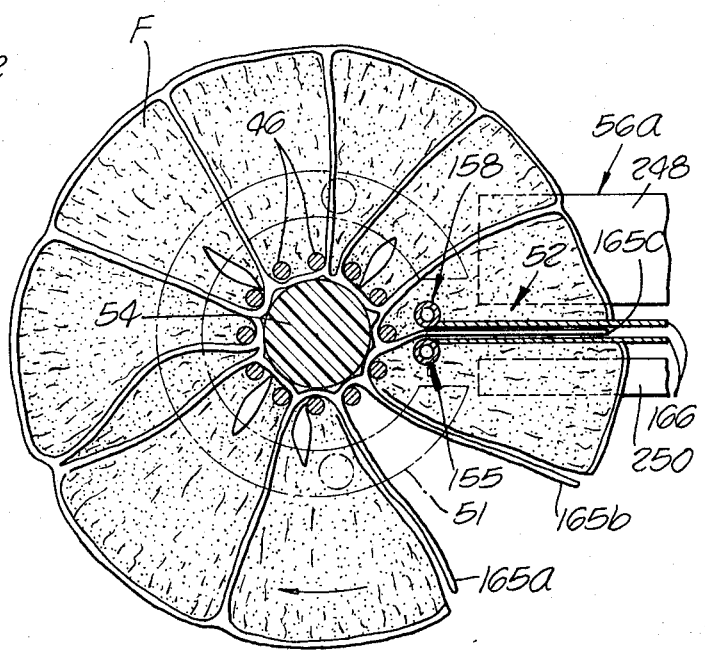

MEANS FOR SECTIONIZING CITRUS FRUIT

BACKGROUND OF THE INVENTION

The three Shrewsbury U.S. Pat. No. 3,022,016, No. 3,030,995, and No. 3,081,805, which are hereby incorporated into the present disclosure by reference, teach how a single peeled citrus fruit may be sectionized by rotating the fruit by stages and straddling the radial membranes of the fruit in succession by a dual reciprocative tool that employs radially outwardly directed jets of water to separate the fruit membranes from the fruit sections. A rotary holder has a set of tines that penetrate the fruit and the rotation of the fruit is indexed with respect to the radial membranes of the fruit by partially inserting a sectionizing tool into the rotating fruit and then stopping the rotation in response to impingement of a radial membrane of the fruit against the partially inserted tool. The sectionizing tool is then reciprocated along the opposite sides of the fruit membrane to separate the membrane from the adjacent fruit sections and then the fruit is automatically rotated another step in preparation for severance of the next fruit section.

Copending Shrewsbury et al. application, Ser. No. 697,215, filed Jan. 11, 1968, now Pat. No. 3,566,940 discloses a commercially successful apparatus for rapidly sectionizing successive pluralities of the fruit, the procedure starting with the operator of the apparatus impaling nine fruit on the spikes of nine loaders at a forward loading station of the apparatus. Nine rotary holders having circular sets of downwardly extending tines reciprocate between the forward loading station where they receive the fruit from the nine loaders and a rearward sectionizing station where the holders rotate step-by-step in timed relation to the strokes of sectionizing tools for sectionizing the fruit.

The present application is directed to certain problems and certain needs for improvement that have developed since the prior application was filed.

One such need relates to a positive clutch to rotate a fruit holder at the sectionizing station in the prior disclosure in combination with sensing means to control the clutch, the sensing means detecting when a radial membrane of the rotating fruit impinges on the corresponding sectionizing tool. Such a combination is a complicated mechanism which needs to be simplified without sacrifice in efficiency.

In another of its aspects the prior disclosure employs cup-shaped support means to retain the fruit on the rotary holders during the sectionizing operation. A certain difficulty arises in that the fruit vary widely in size and even when the cups are made of elastomeric material they do not cooperate with fruits of all sizes with equal efficiency.

Another difficulty is that at times residual fruit sections adhere to the outside of the circular set of the tines after a sectionizing operation to interfere with the succeeding sectionizing operation.

Still another need for improvement arises when the described apparatus is employed to sectionize so-called "hot peeled" fruit which has been subjected to a preparatory treatment that, unfortunately, unduly toughens the naturally fibrous string network that encases the sections of the fruit. Too often a sectionizing tool fails to cut through the string network of the fruit when the sectionizing tool slices through a fruit, the sectionizing tool merely pushing against the network with undesirable results.

Certain other problems met by the present disclosure arise in the course of steps that are taken to meet the above-mentioned needs for improvement.

SUMMARY OF THE INVENTION

In the new construction, the holders carrying the fruit for the sectionizing operation are rotated by friction clutches and when a radial membrane of a rotating fruit impinges on the corresponding dual sectionizing tool, the corresponding clutch slips to interrupt the rotation of the fruit long enough for a stroke by the sectionizing tool. Thus, the clutch itself is relied upon to sense a radial membrane of a fruit. The important feature of the invention in this regard is the use of variable air pressure to provide variable mutual pressure between the two friction members of the clutch. It is a simple matter to adjust the air pressure to provide whatever driving torque is operative for the physical character of a particular run of fruit and to change the air pressure for a changeover to a new run of fruit of different physical character.

The inherent disadvantages of using an elastomeric cup to embrace a fruit for the purpose of retaining the fruit on the circular array of tines of a rotary holder throughout a sectionizing operation have been avoided by using a support means in the form of a mandrel instead of a cup to cooperate with each holder. The mandrel is inserted into the axial cavity of the fruit and expands the fruit radially for clamping action against the surrounding tines of the holder. Preferably, the tines are serrated or barbed for more effective retention of the fruit.

The mandrel, unlike the cup it replaces, is freely rotatable and thus rotates with the fruit instead of frictionally opposing the rotation of the fruit. During the sectionizing strokes the holder is also freely rotatable to permit the fruit to rotate in the event the dual sectionizing tool straddles a crooked or inclined radial membrane with consequent cam action that tends to rotate the fruit. Thus, the free wheeling permits the dual sectionizing tool to follow a crooked or inclined membrane instead of rupturing the membrane.

Heretofore the means to strip residue from a holder after a sectionizing operation has consisted solely of an axial stripper that removes the axial membrane residue of a fruit from inside the circular set of tines for disposal at a waste station remote from the sectionizing station. In the new apparatus an annular stripper is added to reciprocate outside the circular set of tines to remove residual fruit sections from outside the circular set of tines while the holder is still at the sectionizing station. The mandrel that cooperates with the holder serves to keep the axial membrane residue of the fruit inside the array of tines from being discarded at the sectionizing station.

The problem of effectively cutting the string network on each stroke of a dual sectionizing tool is met by adding an auxiliary support to contact the fruit from below. The auxiliary support is normally retracted to avoid frictionally opposing rotation of the fruit and is periodically advanced in timed relation to the stroke of the corresponding dual sectionizing tool.

The features and advantages of the invention may be understood from the following detailed description and the accompanying drawings.

BRIEF DESCRIPTION OF THE DRAWINGS

In the drawings which are to be regarded as merely illustrative:

FIGS. 1–6 are diagrammatic views representing successive stages in the operating cycle of the apparatus;

FIG. 7 is a fragmentary view of the apparatus, partly in vertical section and partly in side elevation;

FIG. 8 is an enlarged fragmentary section taken along the line 8—8 of FIG. 7;

FIG. 9 is a vertical section along the line 9—9 of FIG. 8;

FIG. 9a is a greatly enlarged fragmentary elevational view, partly in section, showing how a tine may be of barbed configuration for effective engagement with a fruit;

FIG. 10 is an enlarged section of a fruit loader taken as indicated by the line 10—10 of FIG. 7;

FIG. 11 is a transverse sectional view of the fruit loader as seen along the angular line 11—11 of FIG. 10;

FIG. 12 is a sectional view along the line 12—12 of FIG. 7 showing how a magnet mounted on a fruit loader cooperates with a corresponding stationary reed switch in the automatic cycle of the apparatus;

FIG. 13 is a view, partly in side elevation and partly in section, showing a loader in the course of its upward movement to transfer a fruit to the tines of a corresponding fruit holder;

FIG. 14 is a view, partly in section and partly in side elevation, showing the construction of a holder that may be substituted for the holder shown in FIG. 10 when the apparatus is employed to sectionize cold peeled fruit as distinguished from hot peeled fruit;

FIG. 15 is a sectional view along the line 15—15 of FIG. 7 showing the horizontally movable carriage in front elevation with the vertically reciprocative frame for the sectionizing tools positioned rearwardly of the carriage;

FIG. 16 is a horizontal sectional view taken along the line 16—16 of FIG. 7 showing in plan the plurality of loaders, the horizontal carriage, and the vertical reciprocative tool-carrying frame;

FIG. 17 is a fragmentary elevational view showing a retracted auxiliary support that advances to cooperate with a fruit on a holder of the forward row of holders;

FIG. 18 is a similar view of a retracted auxiliary support that advances to cooperate with a fruit on a holder of the rear row of holders;

FIG. 19 is an enlarged view, partly in section and partly in elevation, showing a fruit holder, a cooperating mandrel, a cooperating auxiliary support, and a corresponding sectionizing tool, the parts being positioned at the stage of the operating cycle that is indicated diagrammatically in FIG. 6;

FIG. 19a is a greatly enlarged fragmentary section of FIG. 19 showing how an inner portion of the fruit is clamped between the mandrel and a barbed tine of the corresponding fruit holder;

FIG. 20 (sheet 7) is a fragmentary sectional view taken along the line 20—20 of FIG. 19, showing passages for supplying water under pressure to a dual sectionizing tool;

FIG. 21 is a view as seen along the line 21—21 of FIG. 19 showing structure associated with a fixed stripper blade;

FIG. 22 is an enlarged view as seen along the line 22—22 of FIG. 18, showing the structure of an auxiliary support;

FIG. 23 is a fragmentary elevational view of the two ends of a dual sectionizing tool with the lower tool end in edgewise contact with a radial membrane of a fruit;

FIG. 24 is an enlarged fragmentary section of a dual sectionizing tool taken as indicated by the line 24—24 of FIG. 23;

FIG. 25 is a fragmentary view as seen along the line 25—25 of FIG. 24;

FIG. 26 is a transverse section taken as indicated by the line 26—16 of FIG. 23 showing how a radial membrane of a fruit impinges on a probing sectionizing tool;

FIG. 27 (sheet 5) is a sectional view taken along the angular line 27—27 of FIG. 9 showing how a clutch is operatively connected by gears to a corresponding rotary fruit holder;

FIG. 28 is a transverse section along the line 28—28 of FIG. 9 showing how an annular stripper is related to a rotary holder and the corresponding dual sectionizing tool;

FIG. 29 is a diagram of a control system for pneumatically raising and lowering a mandrel;

FIGS. 30–36 (sheet 9) are diagrammatic views presenting successive stages in a sectionizing operation; and FIG. 37 is a diagrammatic sectional view showing a citrus fruit in cross section supported by a mandrel with a dual sectionizing tool straddling a radial membrane of the fruit.

DESCRIPTION OF THE PREFERRED EMBODIMENT

General Description of the Operating Cycle, FIGS. 1–6

The presently preferred embodiment of the invention sectionizes the fruit in batches of nine, and therefore, has nine sets of cooperative components which may be of various constructions in various practices of the invention and which are actuated automatically in suitable sequence to carry out an operating cycle. FIGS. 1–6 are diagrammatic views showing the successive stages in the cycle of operation of one of the nine sets of components, FIGS. 1–5 showing the stages that lead up to the final stage in FIG. 6 where the actual sectionizing operation is performed.

The particular components shown in FIGS. 1–6 comprise: a loader 40 having an upright spike 42 to impale a fruit F axially; an elevated fruit holder, generally designated 45, having a circular set of downwardly extending tines 46 and further having an axial stripper 50 inside the set of tines for stripping the axial membranous residue of the fruit from inside the circular set of tines after a sectionizing operation; an annular stripper 51 to strip residual pulp from outside the circular set of tines after a sectionizing operation; a vertically reciprocative dual sectionizing tool 52 which is equipped with sectionizing blades and provides radial jets of water to facilitate the sectionizing operation; a mandrel 54 rotatably mounted on a stem 55 to cooperate with the fruit holder during the sectionizing operation; an auxiliary support 56 movable from a retracted position to an effective position to support the fruit from below during each stroke of the dual sectionizing tool; an inclined baffle 58 and a discharge chute 60 to receive the successive fruit sections, the discharge chute having a web 61 to receive the fruit sections, the web being perforated to permit the seeds to fall onto a bottom wall 62; and finally a screw conveyor 63 at a waste station to receive the discarded axial membranous residues. Throughout our description of the apparatus the forward side of the apparatus is taken as the side facing the operator, i.e., the side where the operator places fruit on a loader 40.

In the first stage of the operating cycle, a preceding fruit has been through the sectionizing operation represented in FIG. 6 wherein the successive fruit sections S are discharged into the chute 60. While the sectionizing operation shown in FIG. 6 is in process, the operator has impaled fruit F on the spike 42 of the loader 40 in preparation for the next cycle of operation.

The first step of the operating cycle initiated immediately after a sectionizing operation is downward retraction of the mandrel 54 to its lower position shown in FIG. 1. Then the fruit holder 45 moves from its normal rearward operating position shown in FIG. 1 to its forward loading position shown in solid lines in FIG. 2 and as the fruit holder passes through an intermediate position shown in dotted lines in FIG. 2, the axial stripper 50 is operated to discharge the axial membranous residue of the fruit onto the waste conveyor 63.

With the fruit holder 45 now in its forward loading position shown in FIG. 2, the loader 40 rises to transfer the new fruit to the tines of the holder as indicated in FIG. 3. After the fruit is transferred to the holder 45 the loader 40 drops back to its normal position as shown in FIG. 4, and as also shown in FIG. 4, the elevated fruit holder 45 with a new fruit thereon moves rearwardly to the sectionizing station.

The next step shown in FIG. 5 is upward movement of the mandrel 54 into the axial cavity of the new fruit on the holder 45 to cooperate with the holder to support the fruit throughout the ensuing sectionizing operation. Finally, in FIG. 6 the fruit holder 45 rotates in a step-by-step manner and the dual sectionizing tool 52 reciprocates 12 to 16 tines in timed relationship with the step-by-step rotation to carry out the sectionizing operation.

General Arrangement of the Apparatus, FIGS. 7 and 15

FIG. 7 shows the principal parts of the present embodiment of the apparatus for sectionizing a batch of nine fruit simultaneously and FIG. 15 is a plan view of the principal parts.

The structure shown in FIG. 7 includes: a lower fixed support structure generally designated 64 on which the nine loaders 40 are movably mounted; a lower fixed structure 65 on which the nine mandrels 54 are movably mounted; a horizontally movable carriage 66 having nine clutch assemblies 67 from which the nine fruit holders 45 depend, the rear row of clutch assemblies being omitted in FIG. 7; and a vertical reciprocative frame, generally designated 68, that carries nine dual sectionizing tools 52, the rear row of dual sectionizing tools 52 being omitted in FIG. 7.

To carry out the operating cycle that is diagrammatically shown in FIGS. 1–6, the carriage 66 moves horizontally between its rearward position at the sectionizing station shown in FIG. 7, and its alternate forward loading position; the nine loaders 40 move upwardly from their lower retracted positions shown in FIG. 7 to transfer the fruit from the loaders to the holders 45 while the carriage 66 is at its forward loading position; the nine mandrels 54 move upwardly from their retracted positions shown in FIG. 7 to cooperate with the respective holders 45 while the carriage 66 is at the rearward sectionizing station; and the vertically reciprocative frame 68 that carries the nine dual sectionizing tools 52 reciprocates to carry out the nine sectionizing operations simultaneously while the carriage 66 is at the sectionizing station. As will be explained, the reciprocating vertical frame 68 is operatively associated with mechanisms in the nine clutch housings 67 to cause the required step-by-step rotation of the holders 45 with the rotation of the individual holders indexed with respect to the radial membranes of the corresponding individual fruit.

The nine clutch assemblies 67 that carry the nine holders 45 are arranged in two rows on the previously mentioned horizontal carriage 66, as may be seen in FIG. 15. The horizontal carriage 66 comprises essentially a transverse beam 69 with two end plates 70 fixedly mounted on the opposite ends of the beam. The end plates 70 carry pairs of rollers 71 for cooperation respectively with two fixed horizontal guide rods 72 on opposite sides of the apparatus. The forward end of each guide rod 72 is attached to the apparatus frame by means of a corresponding bracket 73 and the rear end of each guide rod is connected to the frame by a similar bracket 74.

To move the carriage 66 between the forward loading station and the rearward sectionizing station, two air cylinders 75 are respectively mounted on opposite sides of the apparatus frame and have forwardly extending piston rods 76 connected to the carriage by corresponding brackets 77.

Structural Details of the Loaders, FIGS. 7, 10–14, 16, and 29

Each of the nine loaders 40 is mounted on a corresponding vertical stem 82 that is slidingly guided by a collar 84 of the fixed structure 64. Each of the vertical stems 82 is connected at its lower end to a piston rod 85 of a corresponding air cylinder 86 and each air cylinder is connected to a compressed air source to lift a corresponding loader 40. One side of the fixed structure 64 carries a baffle 88 to divert the discarded axial membranous residues of the fruit into the screw conveyor 63. As shown in FIGS. 7 and 12, each of the nine vertical stems 82 carries a ring-shaped permanent magnet 90 for cooperation with a corresponding stationary reed switch 92 in the control system for automatically carrying out the operating cycle.

When the apparatus is employed to sectionize hot peeled fruit, the loaders 40 are of the construction shown in FIGS. 7, 10, 11, 13, and 16.

As shown in FIGS. 10 and 11, the upwardly extending stem 82 of each loader 40 is bored and tapped to receive a screw-threaded extension 94 that may be releasably fixed by a locknut 95. Screw threadedly mounted on the extension 94 is a collar 96 having three radial arms 98 that are united with an upwardly extending cylinder 100 that is sharpened along its upper edge to serve as a circular knife, the circular knife being equipped with a radial flange 102. When a fruit is initially impaled on a loader spike 42 the fruit seats on the cutting edge of the circular knife 100 in the manner shown in FIG. 13, but when the fruit is securely impaled by the tines 46 of the corresponding holder 45 and is under pressure from the corresponding loader, the holder rotates approximately 90° to cause the nonrotating circular knife to cut through the fibrous network of the fruit and penetrate the pulp of the fruit, as shown in FIG. 10, as the loader is pushed to its upper limit position, at which limit position the fruit seats on the radial flange 102 of the circular knife.

If the apparatus is to be employed for sectionizing cold peeled fruit, a loader 40a of the construction shown in FIG. 14 is substituted for the holder shown in FIGS. 10, 11, and 13. In FIG. 14 the upper end of the stem 82 has the usual threaded extension 94 that is releasably secured by a locknut 95 and the upper end of the threaded extension constitutes the spike 42 of the holder. The fruit on the spike rests on a shallow conical seat 104 that is united with a threaded collar 105 by three arms 106.

FIG. 13 shows a stage in the upward movement of a loader 40 at which the new fruit is initially penetrated by the tines 46 of the corresponding holder 45. It may be noted in FIG. 13 that the corresponding axial stripper 50 is initially at a low position inside the tines 46, but the axial stripper is pushed upwardly to a limit position inside the tines in response to the final upward movement of the fruit by the loader 40.

Structural Details of the Mandrels, FIGS. 7 and 19

As shown in FIG. 19, the stem 55 on which each mandrel 54 is mounted is bored and threaded at its upper end to receive the screw-threaded lower end of an upwardly extending spindle 108 on which the mandrel is mounted, the spindle being releasably secured by a locknut 110. The mandrel 54, which may be made of a suitable plastic such as nylon, has an axial bore 112 to receive the spindle 108, the bore having a conical upper end 114 to seat a ball 115 which in turn seats on the upper end of the spindle to serve as a thrust bearing for the mandrel. For the purpose of keeping the mandrel from being withdrawn from the spindle 108, the spindle is formed with a circumferential groove 116 and a mandrel carries a removable transverse pin 118 which partially extends into the groove. The axial bore 112 is somewhat oversized relative to the diameter of the spindle 108 so that the mandrel is floatingly mounted on the spindle in the sense that the mandrel has freedom to tilt relative to the spindle to a useful degree to permit the mandrel to align itself with the axial cavities of various fruit.

As shown in FIG. 7, each stem 55 of a mandrel 54 slidingly extends through a corresponding guide collar 120 on the fixed structure 65 and the lower end of the stem is supported by a corresponding piston rod 122 that extends upwardly from a corresponding fixed air cylinder 124. The air cylinders 124 are incorporated in a pneumatic control system for all of the mandrels 54, the portion of the control system for an individual mandrel being shown diagrammatically in FIG. 29, where it may be seen that the piston rod 122 that carries the mandrel is united with piston 125.

In FIG. 29 compressed air supplied from a suitable source is maintained at a relatively high pressure, say 60 p.s.i., by a pressure regulator 126 and is fed to two four-way valves 128 and 130 which are two-position two-connection solenoid valves. Valve 128 is connected by a line 132 to a manifold 134 that is connected to the upper end of each of the nine air cylinders 124. In like manner the valve 130 is connected by a line 135 to a manifold 136 that is connected to the lower ends of the various air cylinders 124.

At the normal lower positions of the mandrel 54, the valve 130 vents the lower ends of the various cylinders 124 to the atmosphere and the valve 128 supplies air under pressure to the upper ends of the cylinders to keep the pistons 125 down. At the proper point in the operating cycle, valve 128 vents the upper ends of the cylinders 124 to the atmosphere and valve 130 supplies air at 60 p.s.i. to the lower ends of the various cylinders to move the various mandrels 54 upwardly with substantial force.

When a mandrel 54 reaches its upper position, however, the corresponding valve 128 supplies compressed air at 60 p.s.i. to the upper end of the corresponding cylinder 124. With both ends of the cylinder 124 now under 60 p.s.i. air pressure, the piston 125 is maintained in its upper position by a force differential of approximately 5 p.s.i. which is explained by the fact that the cross-sectional area of the piston rod 122 reduces the effective area of the upper face of the piston 125. The reduction of pressure to maintain the mandrel 54 at its upper limit position during the sectionizing operation is desirable to avoid undue resistance to the step-by-step rotation of the fruit by the rotary holders.

The control system for carrying out the operating cycle includes a permanent magnet 90 on each of the stems 55 and a cooperating stationary reed switch 92 to sense a particular elevation of the mandrel. Advantageously, the support structure for the gang of mandrels 54 is identical with the support structure for the gang of loaders 40 as may be seen in FIG. 7.

The spikes 42 of the loaders 40 initially expand the axial cavities of the fruit and the mandrels 54 are of larger cross section than the spikes. After a fruit is transferred to a holder, the corresponding mandrel enters the axial cavity of the fruit and expands the fruit radially to cooperate with the tines to clamp the fruit firmly. Preferably, the tines are serrated and may be of barbed longitudinal cross section for more effective cooperation with the mandrels. FIG. 9a, for example, shows how a tine 46 may be formed with a buttress screw thread 93 to provide the barbed configuration and FIG. 19a shows how a mandrel 54 expands the pulp of the fruit into positive engagement with the screw thread.

Structural Details of the Dual Sectionizing Tools, FIGS. 7-9, 17-19, and 22-25

As shown in FIGS. 7, 15, and 16, the vertically reciprocative frame 68 which carries the dual sectionizing tools 52 includes a cylinder 138 on the opposite ends of which are respective end plates 142 that carry pairs of rollers 143 by means of which the frame is immovable along two fixed vertical guide rods 144. As shown in FIG. 16, rigidly mounted on the cylinder 138 are four short horizontal tubes 145 carrying corresponding sectionizing tool heads 146 of a rear row of four tool heads and five longer horizontal tubes 148 carrying corresponding five sectionizing tool heads 146 of a forward row of the heads. The cylinder 138 and the various tubes 145 and 148 not only support the nine sectionizing tool heads, but also serve as conduit means for delivering water to the tool heads and for this purpose the cylinder 138 is connected to a suitable pressurized water source (not shown) by a flexible hose 150 (FIG. 16). The vertical frame 68 is actuated by a central piston rod 152 (FIGS. 7 and 16) which extends downwardly from an air cylinder 154 (FIG. 7).

The dual sectionizing tool 52 carried by each of the nine tool heads 146 has a pair of closely spaced sectionizing tool members, one tool member 155 of each pair being relatively long by virtue of a relatively long probe 156 on its leading end, the other tool member 158 being shorter by virtue of a shorter probe 160 (FIG. 9) at its leading end. As best shown in FIGS. 19 and 20, each of the tool heads 146 has an angular water passage 162 in communication with the corresponding tube 145 or 148 and two passages 163 of smaller cross section respectively place the angular passage in communication with the upper ends of the two tool members 155 and 158.

There is a tendency for a portion of a fruit to wedge between the two sectionizing tool members 155 and 158 and to remain there as the tool members return to their upper starting positions. To combat such wedging action, a suitable stripper blade 164 is fixedly mounted on the frame of the apparatus in position to extend between each pair of sectionizing tool members. FIGS. 17, 18, 19, and 21 show such stripper blades 164.

FIGS. 24 and 37 show diagrammatically a radial membrane 165 of a citrus fruit and indicate how the two tool members 155 and 158 of a dual sectionizing tool 52 are intended to straddle the membrane for the purpose of separating fruit sections from the opposite faces of the membrane. Each of the two sectionizing tool members fixedly carries a laterally extending blade 166, the two blades being intended to extend close to the opposite faces of a radial membrane. Each of the blades 166 is dimensioned to extend radially of a citrus fruit beyond the perimeter of the fruit as may be seen in FIGS. 19 and 37, so that the blade will completely sever the natural string network of the fruit that initially encases the fruit sections. Each of the two blades 166 has an inclined leading edge 168 to facilitate severance of the network.

Each of the two sectionizing tool members 155 and 158 is of hollow construction to serve as a conduit for the pressurized water and each of the tool members is formed with a pair of relatively short longitudinal slots 170 (FIGS. 24, 25) for discharging the pressurized water in thin jet streams. It is to be noted in FIG. 24 that the two slots 170 are each at an angle of about 45° relative to the intervening fruit membrane 165. The two thin jet streams converge on the fruit membrane 165 and are confined against the opposite sides of the membrane by the two blades 166. It is to be noted in FIG. 24 that the two slots 170 are tangential to the inner tubular surfaces of the two corresponding tool members so that a vortex is caused in the stream of water inside of each of the sectionizing tools in the region of the corresponding slot 170.

The Operating Cycle of a Pair of Sectionizing Tools, FIGS. 30-37

FIG. 37 shows diagrammatically a typical citrus fruit held by the tines 46 of a rotary fruit holder with the fruit supported from below by a mandrel 54. The blades 166 of the two sectionizing tool members 155 and 158 of a dual sectionizing tool 52 is seen to extend radially well beyond the periphery of the fruit. It is assumed that the fruit holder intermittently rotates the peeled fruit clockwise as viewed in FIG. 37.

The successive stages in the operating cycle of a pair of sectionizing tool members 155 and 158 are shown diagrammatically in FIGS. 30-36. At the beginning of the cycle represented by FIG. 30, it is assumed that the pair of tool members 155 and 158 have successively straddled two radial membranes 165a and 165b of the fruit (see FIG. 37) with the consequent removal of a section of a fruit (not shown) that is bounded by the two membranes. In FIG. 30 the two tool members 155 and 158 are poised to begin an operation which will involve straddling the next radial membrane 165c for the purpose of removing the next fruit section.

Since the two tool members 155 and 158 are aligned with the radial membrane 165b that has just been processed, the first step in the cycle is for the fruit to be rotated in the direction indicated by the arrow 172 by an increment sufficient to cause the pair of tool members to step over the membrane 165b into alignment with the next section of the fruit. This initial rotation of the fruit to step the two tool members over the previously processed membrane may be termed the stepping rotation of the fruit. With the pair of tool members now aligned with the next fruit section, there is a pause in the rotation of the fruit to permit the long probe 156 of the tool member 155 to slightly penetrate the next section of the fruit as shown in FIG. 32, the pair of tool members being slowly lowered during the pause for this purpose.

With the long probe 156 slightly penetrating the fruit as shown in FIG. 32, the downward movement of the two tool members continues and at the same time rotation of the fruit is resumed in the direction of the arrow 172. Since the resumption of the rotation of the fruit is for the purpose of causing the long probe 156 to search for the next radial membrane 165c, this second rotation of the fruit may be aptly termed the search rotation. With the two tools moving downwardly during the search rotation, the long probe 156 progressively penetrates the fruit section as the next membrane 165c moves laterally towards the long probe.

The search rotation is automatically terminated in response to impingement of the next membrane 165c against the long probe 156, and shortly thereafter the continued downward travel of the two tool members carries out the sectionizing stroke illustrated in FIG. 35 in which the two tool members 155 and 158 straddle the membrane 165c to release the fruit section. At the end of a sectionizing stroke the two tool members return upwardly to their starting positions shown in FIG. 30 and are now ready for stepping rotation of the fruit in the direction of the arrow 172 in preparation for severance of the next fruit section.

To carry out this cycle of operations for removing the successive sections of a fruit, the invention provides automatic means to cause a fruit to repeatedly make a stepping rotation followed by a pause and then a search rotation and the invention further provides means to terminate the search rotation of each of the nine citrus fruit individually in response to impact of a radial membrane 165 of the fruit against the long probe 156 of the corresponding tool member 155.

Means to Cause Step-by-step Rotation of a Plurality of Fruit, FIGS. 8, 9, 15, and 27

Referring to FIGS. 8 and 9, each of the previously mentioned clutch assemblies 67 includes an upright shaft 174 which is journaled in fixed sleeve bearings 175 and 176 is supported by a diametrical pin 178 which extends through a diametrical bore 180 in a lower friction clutch member 182. The lower friction clutch member 182, in turn, is supported by the upper sleeve bearing 175.

An upper friction clutch member 185 is both rotatably and slidably mounted on the upper end of the shaft 174, and as shown in FIG. 9, is normally held at an upper position by a concealed coil spring 188 that backs against the upper end of the shaft 174. At this normal upper position of the upper friction clutch member 185, there is a narrow clearance space 189 between the two friction clutch members which makes the lower friction clutch member nonresponsive to rotation of the upper friction clutch member.

The lower friction clutch member 182 serves as a drive gear and for this purpose as best shown in FIG. 27, is formed with outer circumferential teeth 190 in mesh with a driven pinion 192 that is operatively connected to the associated fruit holder 45. In the construction shown the fruit holder 45 which carries the circular set of tines 46 is mounted on a tubular shaft 194 that is journaled in two fixed bearings 195. The pinion 192 is fixedly mounted on the upper end of the tubular shaft 194 and supports the tubular shaft by resting on the upper sleeve bearing 195.

The previously mentioned axial stripper 50 of the holder 45 is mounted on the lower end of a vertical rod 196 that slidingly extends through the tubular shaft 194, the upper end of the rod being connected to a piston rod 198. The piston rod 198 extends downwardly from an air cylinder 200 which is mounted on the top of the clutch assembly, as best shown in FIG. 7. A suitable flexible hose 202 (FIG. 7) connects each of the nine air cylinders 200 to a suitable source of compressed air under the control of suitable valve means. It is apparent that with the upper clutch member 185 serving as drive means, the two friction clutch members may be frictionally engaged to rotate the tines 46 of the corresponding holder 45 and that the axial stripper 50 inside the set of tines may be lowered by energization of the upper air cylinder 200 to strip the axial membranous residue of the fruit from inside the set of tines.

Within the scope of the invention any suitable means may be provided to rotate the nine upper clutch members 185 for the purpose of rotating the nine fruit holders 45. In the present embodiment of the invention the upper friction clutch members 185 are intermittently oscillated and for this purpose each of the upper friction clutch members is provided with an upwardly extending pin 204 shown in FIG. 9 that is straddled and oscillated by a corresponding reciprocative fork member 205.

As shown in plan in FIG. 16, the nine fork members 205 are rigidly mounted on a reciprocative transverse bar 206 which may be termed an index bar and which is slidably mounted on the carriage 66 by means of two pairs of rollers 208 (FIG. 15) mounted in two corresponding brackets 210. As shown in FIG. 15, the index bar 206 is connected by an angular bracket 212 to a piston rod 214 of an air cylinder 215, the air cylinder being fixedly mounted on the horizontal carriage 66 by a bracket 216.

For the purpose of depressing each of the upper friction clutch members 185 into engagement with the corresponding lower friction clutch member 182 in opposition to the corresponding spring 188, the upper end of each clutch assembly 87 is provided with an air chamber 218 having a lower movable wall in the form of a diaphragm 220. The air chamber 218 is connected by a fitting 222 and a corresponding flexible hose 224 to a suitable source of compressed air. When the air in the air chamber 218 is under pressure the diaphragm 220 presses downwardly against the upper end of the upper friction clutch member 185 to overcome the resistance of the concealed spring 188 and thus press the upper friction clutch member against the lower friction clutch member 182 for rotary operation of the corresponding fruit holder 45.

The vertical reciprocative movement of the frame 68 that carries the dual sectionizing tools is utilized to rotate fruit holders 45 on the horizontal carriage 46 in timed relation to the vertical movements of the sectionizing tools. In the present embodiment of the invention the actuating mechanism includes an upright cam 230 (FIG. 15) which is mounted on the forward edge of one of the end plates 142 of the vertical frame 68. The upright cam 230 has a straight back edge 232 and when the horizontal carriage 66 returns from its forward loading position to its normal rearward operating position, a backup roller 234 journaled on the horizontal carriage is positioned against the straight back edge 232 to reinforce the cam against the reaction of the load on the cam.

A second roller 236 which functions as a cam follower is mounted by a bracket 238 on the end of the previously mentioned index bar 206 to cooperate with the cam 230 for longitudinally reciprocating the index bar thereby to oscillate the various upper friction clutch members 185. When the cam 230 is carried downwardly by the vertically reciprocative carriage 68 on which it is mounted, the air cylinder 215 is automatically energized in one respect to press the follower roller 236 against the working surface of the cam to make the index bar 206 responsive to the cam and during the return upward movement of the vertical frame the air cylinder is energized in the opposite respect to retract the follower roller 236 from the cam.

For cooperation with the follower roller 236 the cam 230 has a first sloping shoulder 240 followed by a relatively short dwell 242 leading to a second sloping shoulder 244 with the second sloping shoulder leading to a relatively long dwell 245. The first sloping shoulder 240 cooperates with the follower roller 236 to carry out the initial stepping rotation of a fruit that is represented by FIGS. 30, 31 during the period in which the vertical frame 68 initially moves downwardly at a relatively slow rate. The first dwell 242 causes the pause in the rotation of the fruit to permit the long probe 156 to make initial penetration of the fruit as indicated by FIG. 32. The second sloping shoulder 244 of the cam creates the search rotation of the fruit indicated by FIGS. 32, 33 as the vertical frame continues to move downwardly. The searching rotation of the fruit is interrupted by impingement of the next radial membrane 165c of the fruit against the probe 156 of the long sectionizing tool. The second long dwell 245 which is created by disengaging a clutch permits the fruit to pause while the vertical frame 68 continues downwardly to cause each dual sectionizing tool to make a sectionizing stroke that is represented by FIGS. 34, 35.

The search rotation of the various fruit holders 45 that is caused by the second sloping shoulder 244 of the cam is of sufficient extent to accommodate the widest section of a fruit that can ordinarily be expected. Therefore, the search rotation of each individual fruit will usually be terminated in a much lesser time period because the probe of the corresponding sectionizing tool traverses a fruit section of a width much less than the maximum width.

It is apparent that to carry out the step-by-step rotation of the nine fruit holders 45, it is necessary that the nine clutches be engaged while the follower roller 236 traverses the first sloping shoulder 240, the first dwell 242, and the second sloping shoulder 244 of the cam. For this purpose a suitable valve control (not shown) supplies compressed air simultaneously to the nine air chambers 218 for a period of time of sufficient duration to permit the follower roller 236 to reach the bottom of the second sloping shoulder 244 of the cam.

The air pressure in air chamber 218 which controls the mutual pressure of two cooperating friction clutch members 182 and 185 is high enough to create sufficient torque to cause the fruit to rotate against the resistance of the inserted probe 156 as long as only pulp encounters the probe. The air pressure is too low, however, to overcome the abrupt rise in resistance to rotation of the fruit caused by a radial membrane 165 encountering the probe 156. Consequently, the lower friction clutch member 182 slips while the sectionizing stroke of the corresponding dual sectionizing tool occurs.

The downward movement of the vertical frame 68 that carries the dual sectionizing tools is relatively slow until the follower roller 236 reaches the relatively long second dwell 245 and then the downward movement continues to carry out the sectionizing stroke. The air cylinder 215 is energized in the direction to press the follower roller 236 against the cam 230 until near the end of the downward stroke of the dual sectionizing tools, the air cylinder being then energized in the opposite respect to retract the follower roller during the return upward movement.

An important feature of the invention is that the air pressure in the air chamber 218 may be readily adjusted as required for different runs of fruit. If the fruit is relatively firm the air pressure may be relatively high, and if the fruit is relatively soft the air pressure may be quite low.

Preferably, the probe 156 of the long sectionizing tool member 155 is of the general cross section shown in FIG. 26. The probe 156 is tapered to a leading edge that makes contact with the membranes of the rotating fruit and the leading edge is narrow to reduce resistance to rotation of the fruit in which the probe is inserted.

Provisions for Cutting the String Network of the Fruit

As heretofore stated, if the apparatus is employed to process cold peeled fruit which has no string network, the loader 40a shown in FIG. 14 is used at each loader station. When the apparatus is employed to process hot peeled fruit which has a relatively tough string network, however, loaders are employed of the character shown in FIGS. 7, 10, 11, and 13, and as such a loader approaches its upper limit position in transferring fruit to the corresponding fruit holder 45, the fruit holder is rotated approximately 180° to cause the circular cutting edge 101 of the loader to cut through the string network of the fruit. The manner is which the circular cutting edge penetrates the fruit may be seen by comparing FIGS. 13 and 10.

Since the horizontal carriage 66 is at the forward loading station and the cam 230 is at the sectionizing station, the cam is not available to rotation of the holders 45 for cutting the string network. The holders 45 are rotated the desired 180°, however, by simply energizing the air cylinder 215 to shift the index bar 206 rightward from its normal retracted position as viewed in FIG. 15, air being supplied at the same time to the nine clutch chambers 218.

At the start of the subsequent sectionizing operation at the rearward sectionizing station, the lower side of each fruit has a circular cut that is indicated at 246 in FIG. 19. As the two blades 166 of a dual sectionizing tool 52 initially advance downwardly to intermediate positions shown in FIG. 19, the two blades effectively cut the upper half of the tough string network because the lower inclined edges 168 of the two blades are at acute angles to the string network to result in slicing action of the blades against the string network. As the lower inclined edges 168 of the blades enter the lower half of the fruit, however, they approach in tangential relation to the string network as may be seen in FIG. 19, and not only does the effective slicing action diminish, but also the blades tend to push the lower half of the network downwardly away from the fruit to distort and damage the fruit.

This problem is met by providing the sectionizing station with the previously mentioned auxiliary supports 56 adjacent the corresponding fruit holders 45, the auxiliary supports being shown in FIGS. 17-19. During the searching rotation of the fruit holders, the auxiliary supports 56 are retracted as shown in FIGS. 17 and 18 to avoid frictional opposition to the searching rotation of the fruit holders. When the dual sectionizing tools make their downward strokes, however, each of the auxiliary supports 56 is advanced to its effective supporting position to support the lower portion of the string network of the fruit, the advanced position of an auxiliary support being shown in FIG. 19. As indicated in FIG. 22, each auxiliary support 56 is made in two sections 248 and 250 which straddle the blades 166 of the corresponding dual sectionizing tool with liberal clearance.

The various auxiliary supports 56 are supported by a fixed transverse bar 252 which, as shown in FIG. 7, is attached to the framework of the apparatus by diagonal bars 254.

The manner in which each auxiliary support 56a of the rearward row of four auxiliary supports is mounted and operated is best shown in FIG. 19. Spaced fixed arms 266 extending downwardly from the fixed transverse bar 252 journal a transverse rocker shaft 270 that carries and actuates the rear row of auxiliary supports 56a. Each auxiliary support 56a is mounted by screws 272 on a corresponding plate 274 that is rotatably mounted on the rocker shaft 270 and is formed with a lower rearwardly extending shoulder 275. A suitable coil spring 276 acts in compression between the shoulder 275 and a set screw 278 in a rocker 280 that straddles the plate 274 as shown in FIG. 22, the rocker being fixedly mounted on the rocker shaft 270 to rock therewith. In the construction shown, the rocker 280 is of split construction and may be tightened at any desired rotary position on the rocker shaft by a pair of capscrews 282.

When the rocker shaft 270 is rocked clockwise as viewed in FIG. 19, the various auxiliary supports 56a on the shaft are rotated clockwise from their retracted positions to their forward effective positions shown in FIG. 19 to support the string network of a corresponding fruit on a holder 45. It is apparent, however, that each auxiliary support 56a is yieldingly mounted on the rocker shaft by virtue of its spring 276 and therefore the advancing auxiliary support is stopped by a fruit with which it makes contact. In this manner each of the auxiliary supports 56a accommodates itself to the size of any particular fruit. The pressure that an auxiliary support 56a exerts against a fruit may be adjusted by adjustment of the corresponding setscrew 278.

FIG. 17 shows one of the auxiliary supports 56b of the forward row of five fruit holders. The auxiliary support 56b is mounted on a corresponding plate 284 that is pivotally mounted on a fixed transverse shaft 285. Each plate 284 is controlled by a corresponding link 286 that extends forwardly from a corresponding plate 288 that is rotatably mounted on the rocker shaft 270. Each plate 288 has a rearwardly extending shoulder 290 that abuts one end of a coil spring 292 with the other end of the coil spring backed against a setscrew 294 on a rocker 280b that is of the previously described construction. It is apparent that when the rocker shaft 270 rocks clockwise, the clockwise rotation is yieldingly transmitted to the plate 288 and is transmitted therefrom by the link 286 to the forward auxiliary support 56b. Here again, the pressure that the forward auxiliary support 56b exerts against the fruit may be controlled by adjustment of the setscrew 294.

Any suitable means may be provided to rock the rocker shaft 270 to advance and retract the various auxiliary supports 56a and 56b in timed relation to the strokes of the sectionizing tools. In this embodiment of the invention the rocker shaft 270 is controlled by a cam slot 295 (FIG. 17) in an elongated cam 296 that is adjustably mounted on a downwardly extending fixed arm 298. The upper end of the fixed arm 298 is welded to a pair of U-bolts 300 by means of which the arm is fixedly mounted on the previously mentioned transverse cylinder 138 of the vertically reciprocative frame 68 that carries the sectionizing tools. In the construction shown, the cam 296 is mounted on the fixed arm 298 by suitable cap screws 302 that extend through corresponding vertical slots 304 in the fixed arm to permit vertical adjustment of the cam.

An operating arm 305 that is fixedly mounted on the rocker shaft 270 carries a follower in the form of a roller 306 that tracks in the cam slot 295 and the cam slot is formed with an offset which provides a sloping shoulder 308 to rock the operating arm clockwise to advance all of the auxiliary supports 56a and 56b in response to downward movement of the cam. The offset of the cam slot 295 also provides an opposite sloping shoulder 310 that causes the various auxiliary supports to be retracted on the return upward movement of the sectionizing tools.

To oppose the reaction of the cam 296 to the advance of the auxiliary supports into pressure contact with the fruit, a backup roller 311 is in contact with the back surface 312 of the cam. The backup roller is carried by a bracket 313 that is adjustably mounted on a fixed arm 314 that extends rearwardly from the fixed transverse bar 252.

Structural Details of Stripper Blades 164 and Annular Stripper 51

The fixed transverse bar 252 that carries the auxiliary supports 56a, 56b also carries the previously mentioned fixed stripper blades 164 which, as shown in FIG. 21, extend between the pairs of blades 166 of the sectionizing tools to strip away residual material between the two blades as the blades retract upwardly after each sectionizing stroke.

The manner in which each stripper blade 164 for the rear row of four sectionizing tools is constructed and supported is shown in FIGS. 18, 19, and 21. Each fixed stripper blade 164 of the rearward row is anchored by a pair of screws 315 with the blade clamped between a pair of spacer blocks 316 (FIG. 21) which, in turn, are clamped between a pair of heavy plates 318, the heavy plates being mounted by screws 320 on the fixed transverse bar 252. The screws 315 that hold the stripper plate 164 extend not only through the spacer blocks 316, but also through the heavy plates 318 to unify the assembly. Mounted on the inner faces of the heavy blocks 318 are corresponding stabilizer blocks 322 to stabilize the two corresponding sectionizing tool members 155 and 158. As shown in FIG. 21 the stabilizing blocks 322 which are anchored to the heavy plates 318 by screws 324 have arcuate recesses 325 respectively to cooperate with the two sectionizing tools.

A similar arrangement holds the stripper blades 164b associated with the forward row of five sectionizing tools. As shown in FIG. 17, a pair of heavy plates 318a corresponding to the previously described heavy plates 318 extend forwardly from the transverse bar 252 to carry a forward stripper plate 164b which is secured by a pair of screws 315a. Screws 324a extending through the two heavy plates 318a secure corresponding stabilizer blocks for the corresponding sectionizing tools.

As heretofore stated and shown diagrammatically in FIG. 1, the various annular strippers 51 reciprocate downwardly from normal upper positions to strip fruit pulp from outside the annular arrays of tines of the fruit holders after each sectionizing operation. The annular strippers 51 are shown in upper retracted positions in FIGS. 8 and 9 and the lower limit position of an annular stripper is indicated in dotted lines in FIG. 8. As shown in FIG. 28, each annular stripper 51 is C-shaped in plan with a gap 328 to clear the corresponding pair of sectionizing tool members 155 and 158.

As shown in FIG. 8, each annular stripper 51 is mounted on the lower end of a corresponding piston rod 330 which extends downwardly from an air cylinder 332 that is carried by the corresponding clutch assembly 67, the piston rod extending through a lower guide bushing 334. Each annular stripper 51 is stabilized by an upwardly extending stabilizing pin 335 which slidingly extends through a guide bushing 336. Since the residual fruit pulp that is removed by annular strippers 51 has value, the annular strippers are operated while at the sectionizing station to drop the residual pulp onto the baffle 58 that directs the pulp sections into the chute 60.

Our description in specific detail of the selected embodiment of the invention will suggest various changes, substitutions, and other departures from our disclosure within the spirit and scope of the invention.

We claim

1. In an apparatus of the character described for sectionizing citrus fruit wherein the fruit has an axial cavity with pulp sections radiating therefrom and defined by radial membranes and with an outer fibrous network encasing the sections, the combination of:
  a rotatable holder having a circular array of tines to engage the fruit by penetrating the fruit in the inner radial regions of the sections;
  a loader having an axial spike to penetrate the axial cavity of the fruit;
  means to create relative axial movement of the loader and holder towards and away from each other to transfer the fruit from the loader to the holder; and
  a mandrel to penetrate the axial cavity of the fruit after the fruit is transferred to the holder,
  said mandrel being freely rotatable for rotation with the fruit by the holder.

2. A combination as set forth in claim 1 in which the tines are formed with serrations and the mandrel expands the fruit radially against the serrations.

3. A combination as set forth in claim 2 in which the serrations give the tines a barbed configuration in longitudinal cross section.

4. A combination as set forth in claim 1 in which the axial spike is dimensioned in cross section to expand the cavity to a given degree and in which the mandrel is of larger cross section than the spike for further expansion of the cavity for clamping cooperation with the surrounding tines of the holder.

5. In an apparatus of the character described for sectionizing citrus fruit wherein the fruit has an axial cavity with pulp sections radiating therefrom and defined by radial membranes and with an outer fibrous network encasing the sections, the combination of:
  a rotatable holder having a circular array of tines to engage the fruit by penetrating the fruit in the inner radial regions of the sections;
  a nonrotary loader to initially receive the fruit;
  means to create relative axial movement between the loader and the holder to cause the loader to push the fruit axially into engagement with the holder;
  cutting means on the loader positioned radially from the axis thereof to push against the fruit when the loader pushes against the fruit; and
  means to rotate the holder while the loader pushes against the fruit with the fruit in engagement with the holder thereby to rotate the fruit to cause the cutting means to make a circular cut in said network.

6. A combination as set forth in claim 5 in which the cutting means is an arcuate knife concentric to the axis of rotation of the holder.

7. A combination as set forth in claim 5 in which the loader has an axial spike to penetrate the axial cavity of the fruit.

8. In an apparatus of the character described for sectionizing citrus fruit wherein the fruit has an axial cavity with radial pulp sections defined by radial membranes and with an outer fibrous network encasing the sections, the combination of:
  a rotatable holder having a circular array of downwardly extending substantially parallel tines to engage the fruit by penetrating the fruit from above in the inner radial regions of the sections;
  a reciprocative mandrel movable upward from below the holder towards the holder to penetrate the fruit on the holder axially to retain the fruit in engagement with the holder;
  sectionizing tool means reciprocative to make successive strokes to cut the fruit radially while the fruit is retained on the holder; and
  index means to rotate the holder to permit the sectionizing tool to sever successive sections from the fruit,
  said mandrel being rotatable for frictional rotation by the fruit.

9. A combination as set forth in claim 8 which includes:
  clutch means to releasably connect the index means with the holder for rotation thereof; and
  means to control said clutch means, said control means being effective to engage the clutch periodically for step-by-step rotation of the fruit in timed relation with the reciprocations of the sectionizing tool means and to release the clutch between the steps to permit free wheeling of the fruit during the cutting strokes of the sectionizing tool means.

10. In an apparatus of the character described for sectionizing a citrus fruit having radial sections defined by radial membranes, wherein a rotatable holder retains the fruit for a sectionizing operation by adjacent reciprocative sectionizing tool means and means including a clutch having two cooperative confronting friction members rotates the holder step-by-step in synchronization with the reciprocation of the synchronizing tool means, the sectionizing tool means partially penetrating the fruit during each step of rotation of the holder until a radial membrane of the rotating fruit contacts the sectionizing tool means whereupon the friction clutch slips while the sectionizing tool means straddles the contacted membrane and makes a sectionizing stroke to free both sides of the membrane from the pulp of the fruit, the improvement comprising:
a chamber having a movable wall operatively connected to the friction clutch;
means to supply fluid under pressure to said chamber to create pressure between the two friction members of the clutch; and
means to adjust the fluid pressure in the chamber thereby to adjust the torque transmitted by the clutch to the holder whereby the torque may be adjusted to cause a particular fruit to rotate while the sectionizing tool means partially penetrates the fruit and to cause the clutch to slip when a radial membrane of the particular fruit encounters the partially penetrating sectionizing tool means.

11. A combination as set forth in claim 10 which includes spring means to separate the friction members in the absence of fluid pressure in the chamber.

12. An improvement as set forth in claim 11 which includes means to release the chamber from effective fluid pressure during each sectionizing stroke of the sectionizing tool means to permit free rotation of the holder during the stroke.

13. In an apparatus of the character described for sectionizing a citrus fruit having radial sections defined by radial membranes, wherein a rotatable holder retains the fruit for a sectionizing operation by adjacent reciprocative sectionizing tool means and means including a clutch having two cooperating confronting friction members rotates the holder step-by-step in synchronization with the reciprocation of the synchronizing tool means, the sectionizing tool means partially penetrating the fruit during each step of rotation of the holder until a radial membrane of the rotating fruit contacts the sectionizing tool means whereupon the friction clutch slips while the sectionizing tool means straddles the contacted membrane and makes a sectionizing stroke to free both sides of the membrane from the pulp of the fruit, the improvement comprising:
support means movable axially of the holder from a retracted position to an advanced position to retain the fruit on the holder,
said support means being freely rotatable for rotation with the fruit by the holder;
means to exert axial force of relatively high magnitude on the support means to advance the support means axially and thereafter to exert axial force of relatively low magnitude to reduce the thrust load on the rotating members.

14. An improvement as set forth in claim 13 which includes: a cylinder with a piston therein;
a piston rod extending from a first face of the piston through an end of the cylinder to advance the support means axially in response to fluid pressure in the cylinder against the second face of the piston;
means to introduce fluid at relatively high pressure into the cylinder to act against the second face of the piston to advance the support means;
means to introduce fluid into the cylinder at substantially the same pressure to act against the first face of the piston when the support means is advanced thereby to create a relatively low pressure differential on the piston determined by the relative cross sectional areas of the piston and the piston rod.

15. An improvement as set forth in claim 14 which includes: means to reduce the fluid pressure in the cylinder against the second face of the piston to cause the relatively high fluid pressure against the first face of the piston to retract the support means after a fruit is sectionized.

16. In an apparatus of the character described for sectionizing a citrus fruit having radial sections defined by radial membranes and having an outer fibrous network encasing the sections, wherein a rotary holder retains the fruit for a sectionizing operation by adjacent reciprocative sectionizing tool means and means including a clutch having two cooperating confronting friction members that rotates the holding means step-by-step in synchronization with the reciprocation of the synchronizing tool means, the sectionizing tool means partially penetrating the fruit during each step of rotation of the holding means until a radial membrane of the rotating fruit contacts the sectionizing tool means whereupon the friction clutch slips while the sectionizing tool means straddles the contacted membrane and makes a sectionizing stroke to free both sides of the membrane from the pulp of the fruit, the improvement to facilitate cutting of the fibrous network of a fruit by the sectionizing tool means, comprising:
an auxiliary support to abut the fibrous network of the fruit adjacent the path of reciprocation of the sectionizing tool means to oppose displacement of the network by the sectionizing tool means as the sectionizing tool means completes its sectionizing stroke.

17. An improvement as set forth in claim 16 which includes:
means to advance and retract the auxiliary support in timed relation with the reciprocations of the sectionizing tool means to advance the auxiliary support into contact with the fruit during each stroke of the sectionizing tool means and to retract the auxiliary support in the time intervals between the strokes of the sectionizing tool means to avoid frictionally resisting rotation of the fruit by the holder.

18. An improvement as set forth in claim 16 in which the auxiliary support has a slot to clear the path of the sectionizing tool means.

19. An improvement as set forth in claim 16 in which the auxiliary support has a concave portion for abutment against the fruit.

20. An improvement as set forth in claim 16 which includes an actuating means to advance and retract the auxiliary support;
and which includes yielding means operatively connecting the actuating means to the auxiliary support whereby the advance of the auxiliary support is terminated by contact of the auxiliary support with the fruit whereby the auxiliary support accommodates itself to the size of the particular fruit.

21. In an apparatus of the character described for sectionizing operations on citrus fruit, wherein the fruit has an axial cavity with pulp sections radiating therefrom and defined by radial membranes and with an outer fibrous network encasing the sections, the combination of:
a rotatable holder having a plurality of tines to hold the fruit during sectionizing operations by penetrating the pulp of the fruit in the inner radial regions of the sections;
stripper means shaped and dimensioned to at least partially surround the plurality of tines and normally retracted from the fruit on the tines; and
actuating means to advance said stripper means along said tines lengthwise thereof towards the free ends of the tines after a sectionizing operation to remove residual fruit pulp from outside the plurality of tines.

22. A combination as set forth in claim 21 which includes:
second axial stripper means inside the plurality of tines and normally retracted from the fruit on the holder; and
second actuating means to advance the second axial stripper means towards the free ends of the tines after a sectionizing operation to remove axial membranous residues of the fruit from inside the array of tines.

23. The combination as set forth in claim 22 which includes means to reciprocate the holder between a loading station and a sectionizing station;

which includes means to receive the fruit pulp at the sectionizing station for disposal of the fruit pulp;

which includes disposal means at a station between the loading station and the sectionizing station to receive the axial membranous residues from the holder;

which includes means to energize the first actuating means after a sectionizing operation while the holder is at the sectionizing station; and which includes means to energize the second actuating means when the holder reaches the region of the disposal means after a sectionizing operation.

24. In an apparatus of the character described for sectionizing citrus fruit, wherein the fruit has an axial cavity with pulp sections radiating therefrom and defined by radial membranes and which includes a holder having a plurality of tines to penetrate the fruit to hold the fruit for a sectionizing operation, the improvement comprising said tines being of serrated configuration to resist withdrawal of the fruit from the tines.

25. An improvement as set forth in claim 24 in which said tines are of barbed longitudinal cross sectional configuration of offer relatively little resistance to penetration of the fruit and to offer substantial greater resistance to withdrawal of the fruit from the tines.

26. An improvement as set forth in claim 24 in which said tines are formed with buttress screw threads to provide the barbed longitudinal cross-sectional configuration.

27. An improvement as set forth in claim 24 which includes a mandrel for insertion into the axial cavity of a fruit while the fruit is on the holder to cooperate with the serrations of the tines to maintain fruit on the holder.

28. In an apparatus of the character described for sectionizing a citrus fruit having radial sections defined by radial membranes, wherein sectionizing tool means having two substantially parallel blades reciprocates to sever successive sections from the fruit and a holder for the fruit rotates step-by-step in timed relation with the reciprocations of the sectionizing tool means, the sectionizing tool means partially penetrating the fruit during each step of rotation of the holding means until a radial membrane of the rotating fruit contacts the sectionizing tool means whereupon the two blades of the sectionizing tool means straddles the contacting radial membrane of the fruit and the sectionizing tool means makes a sectionizing stroke to free both sides of the membrane from the pulp of the fruit, the improvement comprising:

said sectionizing tool means having two substantially parallel tubes to deliver pressurized water to the region of the two blades, said blades at longitudinal edges thereof being united with said two tubes respectively, said tubes having slots aligned longitudinally thereof to direct the water in streams from the two tubes into the region between the two blades, said slots being substantially tangential to the inner circumferential wall of the tubes to create rotary flow in the tubes when the water reaches the slots.

29. An improvement as set forth in claim 28 in which the slots are at approximately 45° angles relative to the planes of the blades.

* * * * *